US012368015B2

(12) United States Patent
Chen et al.

(10) Patent No.: US 12,368,015 B2
(45) Date of Patent: Jul. 22, 2025

(54) SELF-TEST MECHANISMS FOR END-OF-LIFE DETECTION AND RESPONSE FOR CIRCUIT INTERRUPTER DEVICES

(71) Applicant: Ze Chen, Yueqing (CN)

(72) Inventors: Ze Chen, Yueqing (CN); Gui Chen, Wenzhou (CN)

(73) Assignee: Ze Chen, Yueqing (CN)

( * ) Notice: Subject to any disclaimer, the term of this patent is extended or adjusted under 35 U.S.C. 154(b) by 0 days.

(21) Appl. No.: 18/100,609

(22) Filed: Jan. 24, 2023

(65) Prior Publication Data

US 2023/0170173 A1 Jun. 1, 2023

Related U.S. Application Data

(62) Division of application No. 17/207,883, filed on Mar. 22, 2021, now Pat. No. 11,594,390.

(51) Int. Cl.
| | |
|---|---|
| *H02H 3/16* | (2006.01) |
| *H01H 47/00* | (2006.01) |
| *H01H 50/02* | (2006.01) |
| *H01H 50/44* | (2006.01) |
| *H01H 71/02* | (2006.01) |
| *H01H 71/04* | (2006.01) |
| *H01H 71/62* | (2006.01) |
| *H01H 83/04* | (2006.01) |
| *H01H 83/14* | (2006.01) |
| *H02H 1/00* | (2006.01) |
| *H02H 3/32* | (2006.01) |
| *H02H 3/33* | (2006.01) |
| *H01H 71/24* | (2006.01) |

(Continued)

(52) U.S. Cl.
CPC ...... *H01H 71/0207* (2013.01); *H01H 47/002* (2013.01); *H01H 50/02* (2013.01); *H01H 50/44* (2013.01); *H01H 71/04* (2013.01); *H01H 71/62* (2013.01); *H01H 83/04* (2013.01); *H01H 83/144* (2013.01); *H02H 1/0015* (2013.01); *H02H 3/16* (2013.01); *H02H 3/32* (2013.01); *H02H 3/33* (2013.01); *H02H 3/335* (2013.01); *H01H 2071/044* (2013.01); *H01H 71/2463* (2013.01); *H01H 71/58* (2013.01); *H01H 2083/148* (2013.01); *H01H 2083/201* (2013.01); *H01H 2089/005* (2013.01); *H02H 1/0007* (2013.01); *H02H 3/04* (2013.01)

(58) Field of Classification Search
CPC .. H01H 71/0207; H01H 47/002; H01H 71/04; H01H 83/04; H02H 3/04; H02H 3/16
See application file for complete search history.

(56) References Cited

U.S. PATENT DOCUMENTS

2007/0279814 A1* 12/2007 Bonilla ............... H02H 3/335
361/42
2013/0057990 A1* 3/2013 Finlay, Sr. ............ H02H 3/338
361/50

* cited by examiner

*Primary Examiner* — Scott Bauer
(74) *Attorney, Agent, or Firm* — Mei & Mark LLP (57) ABSTRACT

A circuit for a circuit interrupter is provided. The circuit may in include a first SCR configured to receive a first trigger signal at a gate of the first SCR, a second SCR configured to receive a second trigger signal at a gate of the second SCR, and a third SCR configured to receive a third trigger signal at a gate of the third SCR. A cathode of the first SCR may be connected to an anode of the third SCR. A cathode of the second SCR and a cathode of the third SCR may be connected to a ground. Methods of operating a circuit interrupter and a circuit are also provided.

16 Claims, 4 Drawing Sheets

(51) Int. Cl.
*H01H 71/58* (2006.01)
*H01H 83/20* (2006.01)
*H01H 89/00* (2006.01)
*H02H 3/04* (2006.01)

SELF-TEST MECHANISMS FOR END-OF-LIFE DETECTION AND RESPONSE FOR CIRCUIT INTERRUPTER DEVICES

This application is a Divisional of co-pending U.S. patent application Ser. No. 17/207,883, filed on Mar. 22, 2021, which is a continuation-in-part of co-pending U.S. patent application Ser. No. 16/518,070, filed on Jul. 22, 2019, which is continuation of co-pending U.S. patent application Ser. No. 15/582,746, filed on Apr. 30, 2017, which is a continuation-in-part of U.S. patent application Ser. No. 15/269,513, filed on Sep. 19, 2016, the disclosures of which are herein incorporated by reference in its entirety. U.S. patent application Ser. No. 15/582,746 is also a continuation-in-part of co-pending U.S. patent application Ser. No. 15/393,440, filed on Dec. 29, 2016, the disclosure of which is herein incorporated by reference in its entirety.

TECHNICAL FIELD

The present disclosure relates to apparatuses, circuits, systems, and methods for testing and/or responding to end-of-life conditions in electrical devices, and in particular circuit interrupter devices, such as, but not limited to, GFCI, AFCI, and/or hybrid devices. The present disclosure also pertains to circuit interrupter devices embodying the same.

BACKGROUND

Ground faults may be commonly defined as the existence of a current imbalance between the supply and the return path wherein an undesirable and significant amount of the unreturned current is leaking, or passing through an object—for example a human body, to the ground. Notably, the passage of electrical current through the human body may cause injury or even death.

A current arc is typically caused by a current surging over separated or poorly contacting electrical surfaces within electrical equipment, for example, in its power cord or in an electrical device itself; or within damaged electrical wiring, such as, within the walls of a building. Current arc electrical faults may be defined as current through ionized gas between the two (e.g., supply-side and load-side) separated or poorly contacting electrical surfaces. Such current arcs are often characterized by sparking and extremely high heat, and as a result can cause electrical fires. For example, electrical fires may start when the heat and/or sparking of a current arc causes insulating material or construction material in the vicinity of the electrical fault to combust. Current arc-caused electrical fires may damage property or even endanger human life.

Ground Fault Circuit Interrupters (GFCIs), Arc Fault Circuit Interrupters (AFCIs), hybrid devices (HCIs), and/or the like are commonly deployed to prevent injuries to people and property from dangerous conditions resulting from, for example, current leakages or fires resulting from electrical faults such as current arcs or severe current leakages. Such devices typically detect the occurrence of certain types of electrical faults to prevent harm to persons and property.

It is desirable for circuit interrupter devices, including GFCIs, AFCIs, hybrid devices, and the like, to detect an end-of-life (EOL) condition. It may also be desirable for circuit interrupter devices to include locking mechanisms to provide additional protection from inadvertent resetting, and to enable an end-of-life (EOL) state that prevents any further reset operations and/or use of the electrical device.

In GFCIs, AFCIs, hybrid devices, and other circuit interrupter devices, conventional EOL testing occurs via simulation testing. That is, EOL testing typically occurs by, for example, inducing a leakage current to test ground fault detection capability and/or or artificially generating or mimicking aspects of an arc fault to test arc fault detection capability. A device's failure to recognize and/or properly respond to such a simulated event(s) one or more times may then be interpreted as a critical functional failure. Such a failure(s) may indicate that a device should be considered to be in an EOL condition and that further use is unsafe. In response, such a device may be tripped so that it no longer provides power. In many embodiments, a device may also be placed in an EOL state. In some embodiments, an EOL state may be mechanically permanent and irreversible. Additionally or alternatively, an EOL state may utilize software to irreversible prevent further use of the electronic device. In many embodiments, an EOL state may also be characterized by visual and/or auditory indications to users that the device is in an EOL state and should be removed.

While the above-reference EOL testing techniques may adequately assess when a device is in EOL condition by virtue of a failure to respond to a simulated fault in many circumstances, such techniques may fail to detect other types of failures that may render continued use of the circuit interrupter device unsafe. For example, certain failures in EOL testing circuits, microcontroller units of circuit interrupters, and/or other device circuitry may be overlooked by the aforementioned EOL testing techniques and/or my render the results of such EOL testing unreliable. In turn, electrical devices with one or more undetected EOL conditions may continue to be used, posing a threat to safety and property.

Underwriters Laboratories (UL), an American Worldwide Safety Consulting and Certification Organization, provides criteria that ground fault detection and arc fault detection devices must meet in order to qualify as approved detection devices. UL has also provided criteria requiring mechanisms that prevent the supply of power and/or alert a user where detection devices are improperly installed, for example, where improper installation may hinder the effectiveness of ground fault or arc fault detection or otherwise cause the detection device to malfunction. Further, UL has promulgated certain add-on requirements for EOL testing, which may include monitoring for and analyzing failures of processing units and other circuit components.

Accordingly, incorporating the monitoring of critical functional components of the circuit interrupter devices into EOL testing protocols and mechanisms may be desired. It may be further desirable for such monitoring to be performed continuously and/or repeatedly. Additionally, it would be advantageous for such monitoring to continuously occur by virtue of the design of a circuit interrupter's operational logic architecture. Further, it would be advantageous if such improved EOL testing and response functionality could be easily incorporated into existing circuit interrupter devices—including GFCIs, AFCIs, and HCIs—via a processing unit firmware upgrade and few changes to circuit architecture.

SUMMARY

The present disclosure provides a description of apparatuses, systems, and methods to address the perceived needs and desires described above.

In one example, a circuit for a circuit interrupter is provided. The circuit may in include a first SCR configured to receive a first trigger signal at a gate of the first SCR, a second SCR configured to receive a second trigger signal at a gate of the second SCR, and a third SCR configured to receive a third trigger signal at a gate of the third SCR. A cathode of the first SCR may be connected to an anode of the third SCR. A cathode of the second SCR and a cathode of the third SCR may be connected to a ground.

An anode of the first SCR and an anode of the second SCR may be configured to receive power from a neutral line.

The circuit may further include a fuse and a relay. The anode of the first SCR and the anode of the second SCR may be connected at a first node. The fuse and the relay may be serially connected between the first node and the neutral line.

The circuit may further include a circuit board with first mounting area for the first SCR. The mounting area may have first, second, third, and fourth conductive traces. The first SCR may be mounted on the first mounting area. The gate of the first SCR may be connected to the first conductive trace. The cathode of the first SCR may be connected to the third conductive trace. The anode of the first SCR may be connected to both the second conductive trace and the fourth conductive trace.

The circuit may further include a microcontroller. The microcontroller may be configured to receive a signal from the second conductive trace. The microcontroller is configured to generate the first, second, and third trigger signals.

The microcontroller may be configured to determine that the circuit interrupter is in an end-of-life condition if the signal from the second conductive trace is a 0 V signal.

The microcontroller may be configured to set the first trigger signal as a logic high and set the third trigger signal as a logic high if the microcontroller determines that the circuit interrupter is in an end-of-life condition.

The microcontroller may be configured to set the second trigger signal as a logic high if the microcontroller determines that the circuit interrupter is in an end-of-life condition.

The microcontroller may be configured to receive a signal indicative of whether the circuit interrupter is in a reset state or a tripped state. The microcontroller may be configured to generate the first, second, and third trigger signals.

The microcontroller may be configured to determine that the circuit interrupter is in an end-of-life condition if the first trigger signal is a logic high, the third trigger signal is a logic high, and the microprocessor receives a signal indicating that the circuit interrupter is in a reset state.

The microcontroller may be configured to set the second trigger signal as a logic high if the microcontroller determines that the circuit interrupter is in an end-of-life condition.

The circuit may further include comprising a microcontroller and a transistor. The microcontroller may be configured to continuously maintain a logic low signal on at least one pin while the microcontroller is operational. The at least one pin may be connected to the base of the transistor. The transistor may be configured to set the second trigger signal as a logic high if the microcontroller fails to maintain a logic low signal on the at least one pin.

In another example, a method of operating a circuit interrupter is provided. The method may include simultaneously generating a first trigger signal and a third trigger signal and receiving a status signal indicative of whether the circuit interrupter is in a reset state or a tripped state. The method may include a step of determining that the circuit interrupter is in an end-of-life condition if the status signal indicates that the circuit interrupter is in a reset state.

The method may further include, if it is determined that the circuit interrupter is in an end-of-life condition, generating a second trigger signal.

The method may further include, if it is determined that the circuit interrupter is in an end-of-life condition, placing the circuit interrupter in a permanent end-of-life state.

The method may further include, if it is determined that the circuit interrupter is in an end-of-life condition, providing a visual or auditory indication that the circuit interrupter is in an end-of-life condition.

In another example, a method of operating a circuit is provided. The circuit may include a microprocessor, a first SCR, and a circuit board with a first SCR mounting area with first, second, third, and fourth conductive traces. The fourth trace may be configured to receive power, The first SCR may be mounted on the first SCR mounting area such an anode of the first SCR is aligned with both the second trace and the fourth trace. The method may include steps of receiving a signal from the second trace; and determining whether the SCR or its connection is faulty based on the signal.

The method may further include determining that the SCR or its connection is faulty if the signal is a 0 V signal.

The method may further include generating a trigger signal if the SCR or its connection is faulty.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Disclosed herein are various embodiments of monitoring methodologies to detect certain EOL conditions of circuit interrupters in real time, and/or facilitate rapid response to the onset of such EOL conditions. Such rapid responses may include, but is not limited to, tripping the device (e.g., to deny power to an associated electrical outlet), providing visual and/or auditory alerts, and/or placing a faulty circuit interrupter in an EOL state to protect human life and/or property. Embodiments of circuitry embodying and/or enabling such methodologies are also disclosed. The disclosed monitoring methodologies and circuits may be incorporated into a wide variety of circuit interrupter devices—including, but not limited to, GFCIs, AFCIs, and HCIs—as well as other electrical devices to improve both safety and device reliability.

Figure 1A:
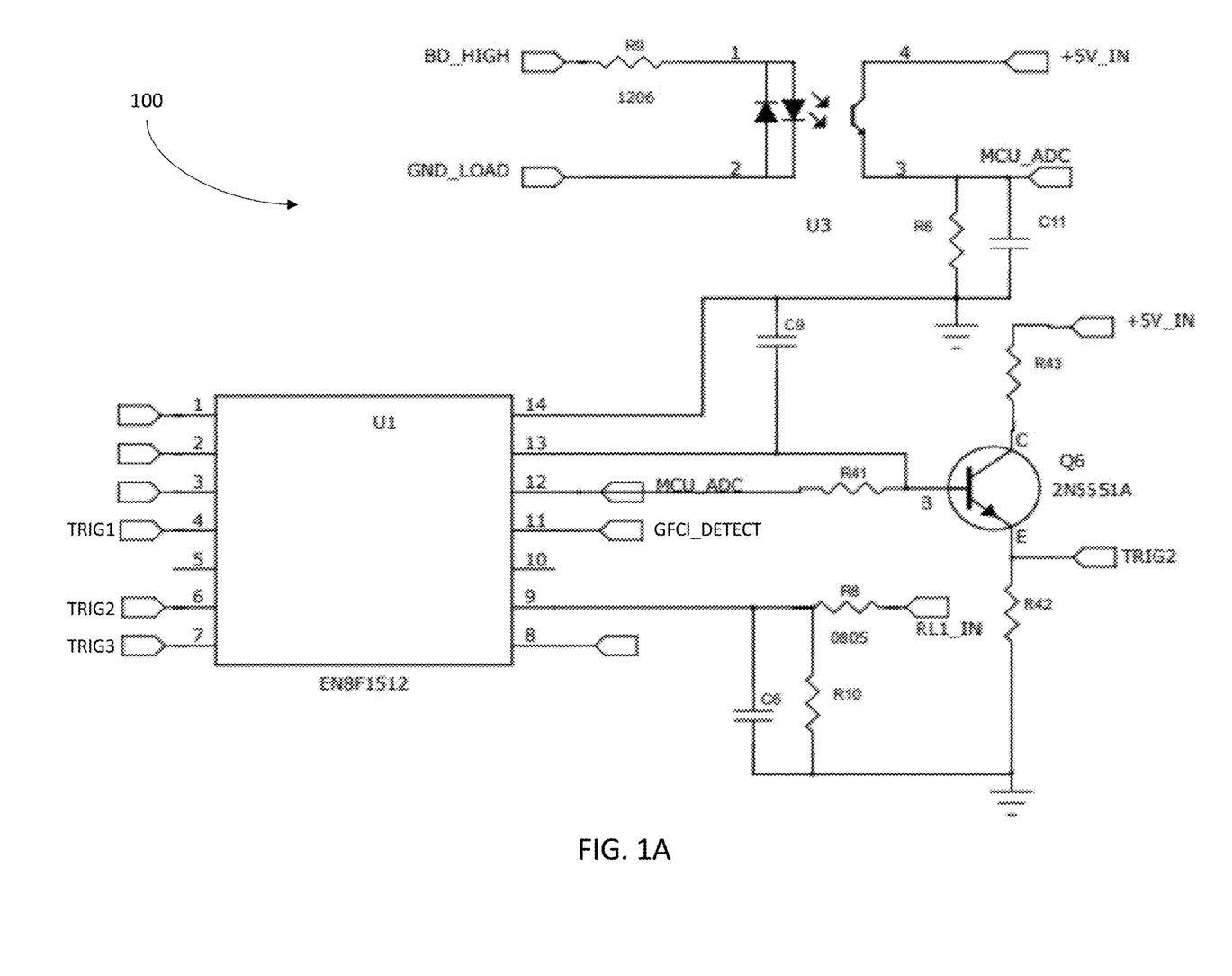
FIG. 1A depicts a circuit diagram of a first embodiment of microprocessor circuitry of a circuit interrupter, consistent with the present disclosure.
Figure 1B:
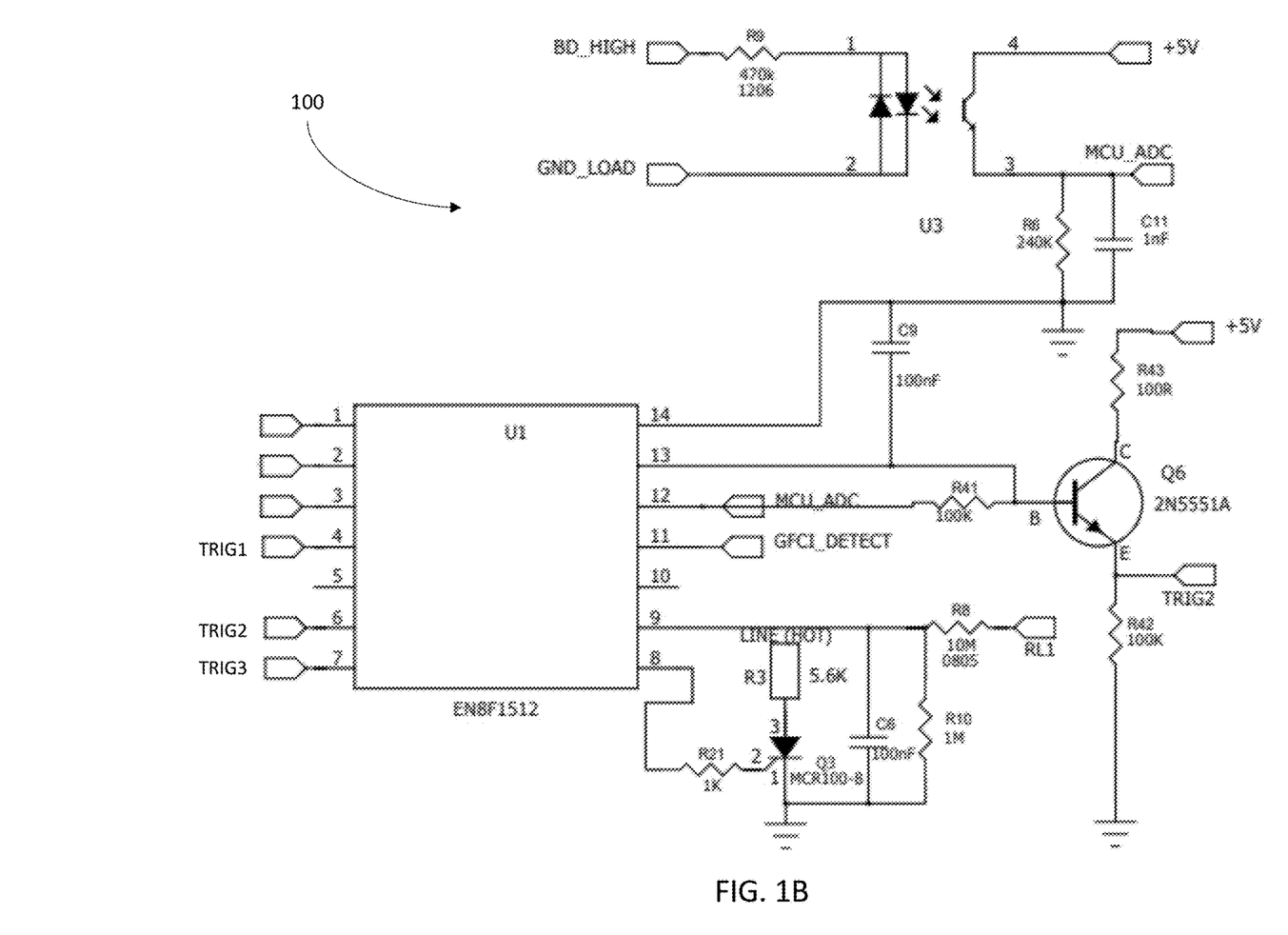
FIG. 1B depicts a circuit diagram of a second embodiment of microprocessor circuitry of a circuit interrupter, consistent with the present disclosure.

With reference to FIGS. 1A and 1B, embodiments of microprocessor circuitry 100 of a circuit interrupter 1 are depicted. Microprocessor circuitry 100 may include U1, which may be any suitable CPU, MCU, or Processing Unit.

In the depicted circuit interrupter 1 embodiments, pin 11 of U1 is labeled GFCI_DETECT and is configured to receive a signal indicative of a ground fault via conventional GFCI circuitry (not shown). It is contemplated that in various embodiments, U1 may additionally or alternatively receive signals indicative of an arc fault, signals from which U1 may assess the presence and/or characteristics of an arc fault, signals from which U1 may assess the presence of a ground fault, and/or signals from which U1 may assess the presence of any other known fault or error.

In the depicted circuit interrupter 1 embodiment, pin 9 of U1 receives EOL condition signal RL1 from EOL signal generation circuitry 200, discussed in further detail below. When EOL condition signal RL1 is at logic low, it may be determined that circuit interrupter 1 is in an EOL condition or is otherwise unpowered.

In the depicted circuit interrupter 1 embodiment, pin 4 of U1 provides trigger signal TRIG1, pin 6 of U1 provides trigger signal TRIG2, and pin 7 of U1 provides trigger signal TRIG3. Trigger signals TRIG1, TRIG2, and TRIG3 may all be generated by U1.

During proper operation of circuit interrupter 1, TRIG1 and TRIG3 are utilized to initiate the tripping process if, for example, a ground fault, or arc fault is detected. In some embodiments, TRIG1 and TRIG3 may also be utilized to initiate the tripping process if and EOL condition is detected. To initiate the tripping process under normal circumstances, U1 may set both TRIG1 and TRIG3 to a logic high. U1 may also set TRIG2 to a logic high to trip circuit interrupter 1, for example if TRIG1 and TRIG3 fail to trip the device.

MCU_ADC is a signal generated via the phototransistor of U3 and serves to indicate whether circuit interrupter 1 is in a tripped state or in a reset state. If circuit interrupter 1 is tripped (or, perhaps, otherwise not supplying power) MCU_ADC will be a logic low signal (0 V). If, however, circuit interrupter 1 is in a reset state, MCU_ADC will be a logic high signal (5 V). Pin 12 of U1 receives MCU_ADC.

Pin 13 of U1 may be maintained at a logic low when U1 is operating properly. Pin 13 may be connected to the base of transistor Q6, thereby preventing Q6 from forcing TRIG2 to a logic high when pin 13 is operating correctly. Should circuit interrupter 1 be in a reset state and pin 13 fail to maintain a logic low, MCU_ADC may cause Q6 to force TRIG2 to a logic high, and in turn, trip the device.

Microprocessor circuitry 100 in FIGS. 1A and 1B are substantially similar, except that FIG. 1B further includes simulation leakage current circuit components that may be utilized for conventional self-testing of circuit interrupter 1's ground fault testing capabilities. To simulate a leakage current, pin 8 of U1 may be set to output a logic voltage high, placing SCR Q3 into forward conduction mode. As a result, the simulated leakage current may flow from LINE (HOT) through R3 and Q3 to ground. If ground fault testing capabilities are working properly, circuit interrupter 1 should detect this simulated fault. If not, U1 may determine that circuit interrupter 1 has failed this self-test; device may be considered to be in an EOL condition due to a functional failure.

Figure 2:
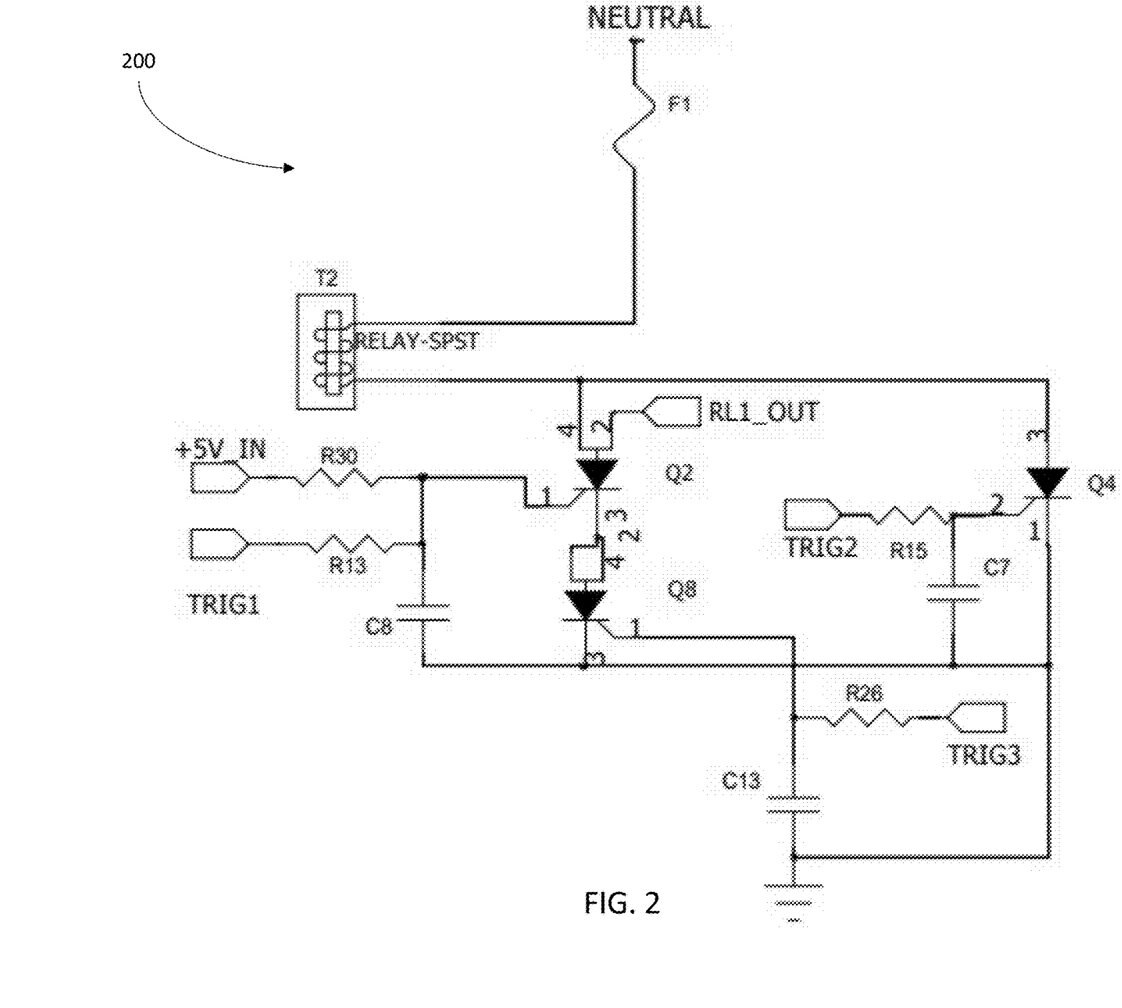
FIG. 2 depicts a circuit diagram of an embodiment of an EOL signal generation circuitry for a circuit interrupter, consistent with the present disclosure.

With reference to FIG. 2, an embodiment of EOL signal generation circuitry 200 of a circuit interrupter 1 is depicted. Neutral line power may be provided to the anodes of SCR Q2 and standby SCR Q4 through, for example, fuse F1 and relay T2. Neutral line power may also be provided to RL1_OUT, which provides EOL condition signal RL1 to pin 9 if U1 via resistor R8 (depicted in FIGS. 1A and 1B) when SCR Q2 is operating properly.

EOL signal generation circuitry 200 may be configured to initiate tripping by permitting neutral line power to flow through serially positioned SCRs Q2 and Q8 and/or through standby SCR Q4. In the embodiment depicted, such neutral power would flow to ground, thereby tripping the device via relay T2. In some embodiments (not depicted in FIG. 2), neutral power follow through serially positioned SCRs Q2 and Q8 and/or through standby SCR Q4 may additionally or alternatively activate another relevant trip and/or alert mechanism. A logic high TRIG1 signal applied to the gate of SCR Q2 may allow neutral line power to flow through SCR Q2 and to the anode of SCR Q8. Additionally or alternatively, a failure of U1 to maintain TRIG1 at a logic low will permit 5 V to flow through resistor R30 and be applied to the gate of SCR Q2. A logic high TRIG3 signal applied to the gate of SCR Q8 may allow neutral line power to flow through SCR Q8 and activate the relevant trip and/or alert mechanisms.

A logic high TRIG2 signal applied to the gate of standby SCR Q4 may allow neutral line power to flow through SCR Q4 and activate the relevant trip and/or alert mechanisms.

Figures 3, 4:
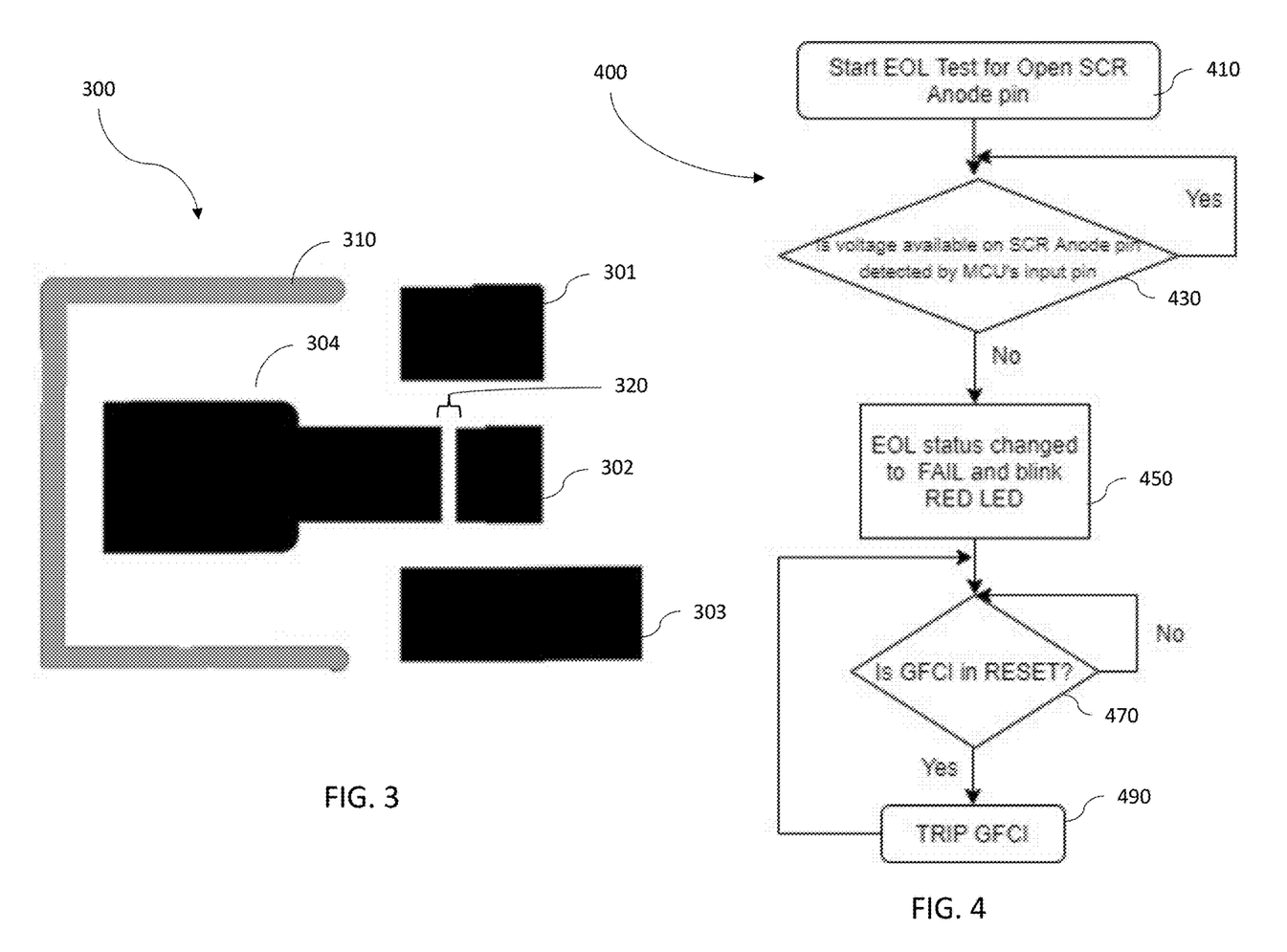
FIG. 3 illustrates an exemplary circuit board trace and marking for mounting a Silicon Controlled Rectifier ("SCR") of the EOL signal generation circuitry of FIG. 2, consistent with the present disclosure.
FIG. 4 is a flowchart of an embodiment of a method of EOL self-testing, consistent with the present disclosure.

With reference to FIG. 3, an exemplary circuit board design 300 for mounting an SCR is depicted. Circuit board design 300 may serve to facilitate detection of an open anode of the mounted SCR. Conductive elements 301-304 represent conductive traces deposited on circuit board. Copper traces may be utilized; however, this disclosure is not so limited; other known conductive circuit traces are contemplated. Marking 310 may indicate the positioning and size of the SCR to be mounted. A nonconductive gap 320 may be positioned between conductive elements 302 and 304. In various embodiments, gap 320 may be 0.05 mm-0.4 mm across, 0.1 mm-0.3 mm across, or 0.15 mm 0.25 mm across. In preferred embodiments gap 320 may be approximately 0.2 mm across.

In certain embodiments of EOL signal generation circuitry 200, at least SCR Q2 may be mounted upon a circuit board implementing exemplary circuit board design 300 or aspects thereof. The gate of Q2 may be connected to conductive element 301 (node 1 in FIG. 2), the cathode of Q2 may be connected to conductive element 303 (node 3 in FIG. 2), and the anode of Q2 may be connected to both conductive element 302 (node 2 in FIG. 2) and conductive element 304 (node 4 in FIG. 2). The anode pin of Q2 may span gap 320 and connect conductive elements 302 and 304.

In this embodiment, the mounting of the SCR Q2 may provide the anode of Q2 the bridge over gap 320; a logic high EOL condition signal RL1 may be received by pin 9 of U1 as an indication that gap 320 is closed. If SCR Q2's anode pin is removed or broken, RL1_OUT may no longer provide a logic high signal; and pin 9 of U1 may be driven low (e.g., by its connection to ground through R10). The lack of a logic high signal on pin 9 may indicate of an EOL condition. Damage to SCR Q2 and its circuit board connections may also be indicative of other physical damage that connection interrupter 1 may have received during manufacture, transport, installation, distribution, use, or otherwise.

In the embodiment of FIG. 2, the mounting of SCR Q8 also embodies exemplary circuit board design 300. Although no EOL condition signal or the like is provided to U1 from SCR Q8 in this embodiment, such additional EOL condition signals or the like are contemplated by this disclosure. In the embodiment of FIG. 2, standby SCR Q4 does not embody exemplary circuit board design 300; SCR Q4 may be mounted via conventional SCR traces and/or markings.

It is contemplated that, in some alternative embodiments, the mounting of standby SCR Q4 may embody exemplary circuit board design 300; additionally or alternatively, another EOL condition signal or the like may be provided to U1 from standby SCR Q4. Similarly, in some alternative embodiments, the mounting of simulation testing SCR Q3 may embody a design substantially similar to exemplary circuit board design 300; additionally or alternatively, another EOL condition signal or the like may be provided to U1 from SCR Q3. Further, in some alternative embodiments, the mounting of transistor Q6 may embody a design substantially similar to exemplary circuit board design 300; additionally or alternatively, another EOL condition signal or the like may be provided to U1 from transistor Q6.

With reference to FIG. 4, a method 400 of monitoring and responding to an EOL condition signal RL1 or the like is provided. It is contemplated that U1 may practice an embodiment of method 400 as a means of a self-testing. An embodiment of method 400 may be embodied in the firmware or other software of U1.

As in step 410, the EOL self-test for an open SCR anode pin may begin. Step 410 may commence on powerup of circuit interrupter 1. Method 400 may proceed to step 430.

As in step 430, U1 may assess EOL condition signal RL1, for example at pin 9. If EOL condition signal RL1 is a logic high, it may be determined that the targeted SCR anode pin and/or its circuit board connections are in good working order. If so, step 430 may be continually repeated throughout the working life of the circuit interrupter 1. In some embodiments, step 430 may be repeated approximately every second; however, this disclosure is not so limited. If, however, EOL condition signal RL1 is a logic low, the method may proceed to step 450.

As in step 450, U1 may determine that circuit interrupter 1 in an EOL condition and may proceed towards placing the device in an EOL state. U1 may make the assessment that circuit interrupter 1 has failed. It may further cause LED indicators to blink, for example in red, to alert users of the failure. Method 400 may proceed to step 470.

As in step 470, U1 may determine whether circuit interrupter 1 in a tripped state or in a reset state. This may be accomplished by, for example, assessing the MCU_ADC signal. If circuit interrupter 1 is in a reset state, the method 400 may proceed to 490. If, however, circuit interrupter 1 is in a tripped state, method 400 may continue to repeat step 470 until circuit interrupter 1 is powered down. In some embodiments step 470 may be repeated approximately every second; however, this disclosure is not so limited. Alternatively, method 400 may end (not shown) if circuit interrupter 1 is in a tripped state.

As in step 490, U1 may attempt to trip circuit interrupter 1. For example, U1 may set both TRIG1 and TRIG3 to logic high. Alternatively, additionally, and/or sequentially, U1 may set TRIG2 to a logic high. After each trip attempt, method 400 may proceed back to step 470.

Beyond facilitating the detection and response to EOL condition signal RL1 generated by an open SCR anode, the disclosed circuitry 100 and 200 may effectively detect and/or respond to other types of EOL conditions that cannot easily be detected via simulated ground/arc faults.

First, if TRIG1 and TRIG3 are set to logic high and the MCU_ADC signal to pin 12 of U1 is a logic high, this may indicate a fault with the tripping circuitry or mechanisms. That is, such a combination of such signals may indicate that tripping was attempted, but failed. In such an event, U1 may detect this failure; it may further characterize it as an EOL condition. Accordingly, U1 may cause LED indicators to blink, for example in red, to alert users of the failure; may set TRIG2 to a logic high to trip the circuit via standby SCR Q4; and/or may trigger EOL mechanisms and/or software such that circuit interrupter 1 is placed in a permanent EOL state.

Second, if standby SCR Q4 is shorted out, neutral line power may be provided through shorted Q4 to activate the trip and/or alert mechanisms. Accordingly, such a short will cause circuit interrupter 1 to immediately trip, thereby preventing an unsafe situation. In some embodiments, trip and/or alert mechanisms may provide feedback to U1 such that this EOL condition may be detected. Accordingly, U1 may cause LED indicators to blink, for example in red, to alert users of the failure and/or may trigger EOL mechanisms and/or software such that circuit interrupter 1 is placed in a permanent EOL state.

Third, if transistor Q6 is shorted out, TRIG2 may automatically be set to logic high. Accordingly, such a short will cause circuit interrupter 1 to immediately trip, thereby preventing an unsafe situation. U1 may detect this EOL condition because it would be unable to maintain pin 6, corresponding to TRIG2, as a logic low. Accordingly, U1 may cause LED indicators to blink, for example in red, to alert users of the failure and/or may trigger EOL mechanisms and/or software such that circuit interrupter 1 is placed in a permanent EOL state.

Fourth, if U1 is unable to maintain pin 13 at a logic low and circuit interrupter 1 is in a reset state (even momentarily), MCU_ADC may energize the base of transistor Q6. Such action will cause TRIG2 to be set to logic high. Accordingly, such a U1 failure will cause circuit interrupter 1 to immediately trip, thereby preventing an unsafe situation. U1 may detect this EOL condition because it would be unable to maintain pin 6, corresponding to TRIG2, as a logic low. Additionally or alternatively, the activation of trip and/or alert mechanisms may provide feedback to U1 such that this EOL condition may be detected. Accordingly, U1 may cause LED indicators to blink, for example in red, to alert users of the failure and/or may trigger EOL mechanisms and/or software such that circuit interrupter 1 is placed in a permanent EOL state.

Fifth, if both SCR Q2 and SCR Q8 are shorted, neutral line power may be provided through shorted Q2 and Q8 to activate the trip and/or alert mechanisms. Accordingly, such a short will cause circuit interrupter 1 to immediately trip, thereby preventing an unsafe situation. In some embodiments, trip and/or alert mechanisms may provide feedback to U1 such that this EOL condition may be detected. Accordingly, U1 may cause LED indicators to blink, for example in red, to alert users of the failure and/or may trigger EOL mechanisms such that circuit interrupter 1 is placed in a permanent EOL state.

The disclosed circuitry 200, however, also provides a robustness in that a short circuit failure of either SCR Q2 or SCR Q8 may not prevent effective, safe operation of circuit interrupter 1. During normal operation, U1 initiates the trip mechanism by setting both TRIG1 and TRIG3 to logic high. Thus, if SCR Q2 is shorted, a TRIG3 logic high allows neutral power to flow through SCR Q8 and activate the trip and/or alert mechanisms. If SCR Q8 is shorted, a TRIG1 logic high allows neutral power to flow through SCR Q2 and activate the trip and/or alert mechanisms. In this manner, SCR Q2 and SCR Q8 may be understood serve as each other's respective back-ups. The ability to continue operating after a short of either Q2 or Q8 should not be considered dangerous because circuitry 200 has at least the failsafe tripping pathways of SCR Q4 and TRIG2.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A method of operating a circuit interrupter, the method comprising:
    simultaneously generating a first trigger signal and a third trigger signal;
    receiving a status signal indicative of whether the circuit interrupter is in a reset state or a tripped state; and
    if the status signal indicates that the circuit interrupter is in a reset state,
        generating a second trigger signal to place the circuit interrupter in a tripped state;
        determining that the circuit interrupter is in an end-of-life condition;
        providing the second trigger signal to a gate of a standby SCR; and
        permitting electrical flow from neutral to ground through a relay by permitting electrical flow through the standby SCR.

2. The method of claim 1, further comprising:
    if it is determined that the circuit interrupter is in an end-of-life condition, placing the circuit interrupter in a permanent end-of-life state.

3. The method of claim 1, further comprising:
    if it is determined that the circuit interrupter is in an end-of-life condition, providing a visual or auditory indication that the circuit interrupter is in an end-of-life condition.

4. The method of claim 2, further comprising:
    if it is determined that the circuit interrupter is in an end-of-life condition, providing a visual or auditory indication that the circuit interrupter is in an end-of-life condition.

5. The method of claim 1, wherein the step of receiving the status signal further comprises:
    receiving the status signal from a phototransistor.

6. The method of claim 5, wherein the step of receiving the status signal:
    receiving a logic high as the status signal if the circuit interrupter is in a reset state; and
    receiving a logic low as the status signal if the circuit interrupter is in a tripped state.

7. The method of claim 4, wherein the step of receiving the status signal further comprises:
    receiving the status signal from a phototransistor.

8. The method of claim 7, wherein the step of receiving the status signal:
    receiving a logic high as the status signal if the circuit interrupter is in a reset state; and
    receiving a logic low as the status signal if the circuit interrupter is in a tripped state.

9. The method of claim 2, wherein the step of receiving the status signal further comprises:
    receiving the status signal from a phototransistor photoresistor.

10. The method of claim 9, wherein the step of receiving the status signal:
    receiving a logic high as the status signal if the circuit interrupter is in a reset state; and
    receiving a logic low as the status signal if the circuit interrupter is in a tripped state.

11. The method of claim 3, wherein the step of receiving the status signal further comprises:
    receiving the status signal from a phototransistor.

12. The method of claim 11, wherein the step of receiving the status signal further comprises:
    receiving a logic high as the status signal if the circuit interrupter is in a reset state; and
    receiving a logic low as the status signal if the circuit interrupter is in a tripped state.

13. A method of operating a circuit, the circuit comprising a microprocessor, a first SCR, and a circuit board with a first SCR mounting area with first, second, third, and fourth conductive traces, the fourth trace configured to receive power, wherein the first SCR is mounted on the first SCR mounting area such an anode of the first SCR is aligned with both the second trace and the fourth trace, the method comprising:
    receiving a signal from the second trace; and
    determining whether the first SCR or its connection is faulty based on the signal.

14. The method of claim 13, further comprising:
    determining that the first SCR or its connection is faulty if the signal is a 0 V signal.

15. The method of claim 14, further comprising:
    generating a trigger signal if the first SCR or its connection is faulty.

16. The method of claim 13, further comprising:
    generating a trigger signal if the first SCR or its connection is faulty.

* * * * *

UNITED STATES PATENT AND TRADEMARK OFFICE
CERTIFICATE OF CORRECTION

| | | |
|---|---|---|
| PATENT NO. | : 12,368,015 B2 | Page 1 of 1 |
| APPLICATION NO. | : 18/100609 | |
| DATED | : July 22, 2025 | |
| INVENTOR(S) | : Ze Chen and Gui Chen | |

It is certified that error appears in the above-identified patent and that said Letters Patent is hereby corrected as shown below:

On the Title Page

Item (62) "Related U.S. Application Data" should be corrected to recite as follows:
Division of application No. 17/207,883, filed on Mar. 22, 2021, now Pat. No. 11,594,390, which is a Continuation-in-part of application No. 16/518,070, filed on Jul. 22, 2019, now Pat. No. 11,205,552, which is a continuation of application No. 15/582,746, filed on Apr. 30, 2017, now Pat. No. 10,410,816, which is a continuation-in-part of application No. 15/393,440, filed on Dec. 29, 2016, now Pat. No. 10,439,387, and a continuation-in-part of application No. 15/269,513, filed on Sep. 19, 2016, now Pat. No. 10,476,252.

Signed and Sealed this
Twenty-seventh Day of January, 2026

John A. Squires
*Director of the United States Patent and Trademark Office*